May 14, 1946.    R. H. DUCEY    2,400,079
LICENSE PLATE
Filed March 20, 1943
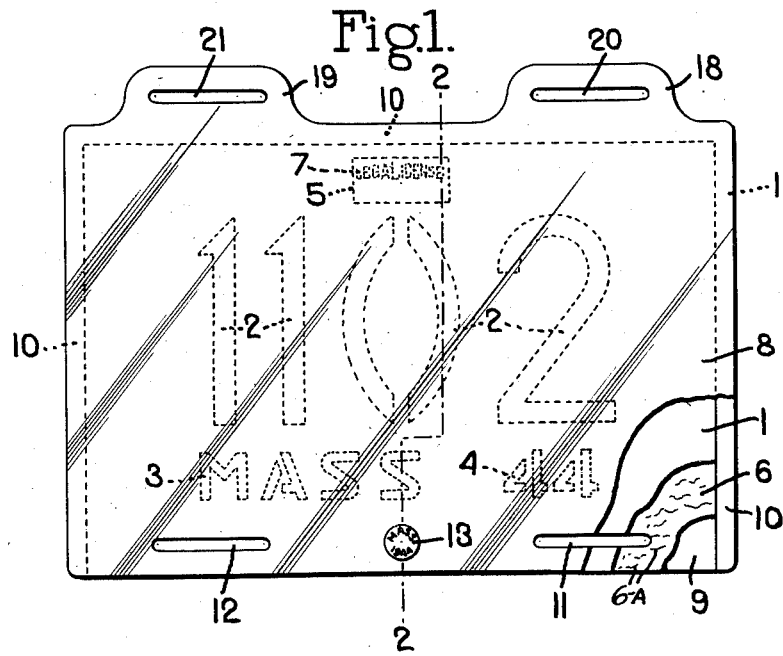
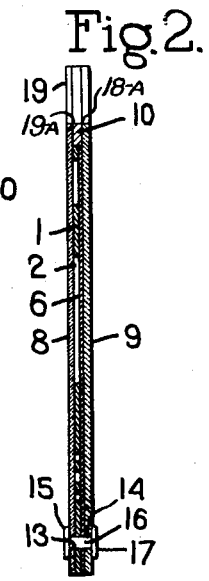
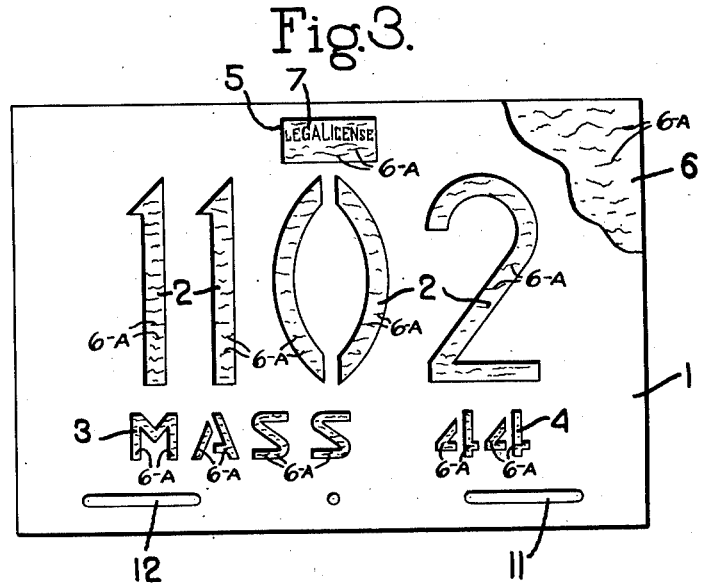
Inventor.
Roger H. Ducey
by Heard Smith & Tennant.
Attys.

Patented May 14, 1946

2,400,079

UNITED STATES PATENT OFFICE 2,400,079

LICENSE PLATE

Roger H. Ducey, Belmont, Mass., assignor to National License Plate Corporation, Boston, Mass., a corporation of Massachusetts Application March 20, 1943, Serial No. 479,842

2 Claims. (Cl. 40—135)

This invention relates to improvements in license plates or other tokens of authority and also relates to license plate units comprising such a license plate or token and a protecting casing or sheath therefor which can be permanently assembled and prevented from disassemblage when in use.

One of the objects of the invention is to provide a license plate or token of the character described embodying undefaceable authenticating means which can be readily observed and a counterfeit or spurious license plate readily detected.

The invention comprises certain improvements upon the license plate construction disclosed in my prior Patent No. 2,156,806, granted May 2, 1939.

Usual license plates for vehicles are in the form of rectangular metal plates presenting a distinctive color and having embossed therein numerals, letters, and other insignia identifying the registration of the vehicle.

In view of the shortage of metal due to war conditions one of the objects of the invention is to provide a non-metallic license plate which can be less expensively manufactured than the metal plates and which therefore will save a large amount of metal for use in production of war materials.

A further object of the invention is to provide a license plate unit construction comprising a license plate of the character described and an enclosing casing or sheath therefor which can be economically manufactured and which will withstand exposure to sunlight and weather without substantial deterioration and also the rough usage to which such license plates are commonly subjected.

A further object of the invention is to provide a license plate and a casing or sheath therefor which when assembled can be officially sealed in such manner as to prevent disassemblage without obvious mutilation.

A further object of the invention is to provide a license plate unit comprising a license plate of the character described and the casing or sheath therefor of plastic material, a part or whole of which is transparent to permit the license number and/or other insignia together with the authenticating means to be readily observed.

Another object of the invention is to provide a license plate casing or sheath comprising narrowly spaced parallel plates of waterproof transparent plastic material permanently and preferably integrally united throughout the major portion of their peripheries with the remainder of the peripheries providing an opening for the introduction of the license plate.

A further object of the invention is to provide a vehicle license plate unit of the character described with a longitudinal recess or recesses above and in proximity to the opening to receive means for fixedly securing the same to the vehicle, and the license plate within the casing or sheath.

These and other objects and features of the invention will more fully appear from the following description and the accompanying drawing and will be particularly pointed out in the claims.

A preferred embodiment of the invention is illustrated in the accompanying drawing, in which, Fig. 1 is a front view of a license plate unit embodying the invention, corner portions being broken away to show the superimposed members of the unit;

Fig. 2 is a vertical sectional view on line 2—2 Fig. 1; and,

Fig. 3 is a front view of the laminated license plate construction, a portion of the front member of the plate being broken away to show authenticating means embodied in the rear member of the plate in addition to authenticating means observable through apertures in the front member of the plate.

This invention comprises a license plate or license token of stiff non-metallic material, preferably paper, having means contrasting in color with that of the sheet identifying the license registration and provided with an aperture or apertures covered by translucent means provided with undefaceable means by which the authenticating of the license plate or token may be readily observed.

The term "license plate" or "license token" is used herein as a plate of suitable material attesting that a license has been secured and bearing a registration number or other insignia identifying it with the license.

The invention also comprises as an article of manufacture a license unit for vehicles or the like comprising superimposed sheets, the inner sheet bearing vehicle identifying means such as a license number plate having authenticating means embodied in the physical structure thereof, one of the outer sheets being transparent and the other outer sheet having a transparent or translucent portion opposite the identifying means rendering the latter visible by translucence of light.

The invention also preferably comprises means by which the parts of the assembled unit may be permanently locked together by an official seal the removal or mutilation of which will invalidate the license.

A preferred form of license plate or license token which is illustrated in Fig. 3 comprises a stencil-like sheet 1, of stiff substantially opaque non-metallic material, preferably stiff paper, having a distinctive color provided with means identifying the registration number or other device which identifies a license which is issued by the proper authority. The identifying means comprises a plurality of apertures including registration numbers or letters together with the name of the State or abbreviation thereof and the year of the license cut through the plate 1 to form a stencil-like registration-identifying insignia. Preferably, as illustrated in the drawing, the sheet 1 also includes an aperture 5 through which official insignia such as the words "LegaLicense" may be displayed.

The license plate construction is provided with suitable undefaceable authenticating means which are visible through the apertures in the sheet 1.

Such authenticating means may be in the form of water marks or threads such as shown at 6—A in Fig. 3 permanently embedded or incorporated in a paper backing sheet 6 which intimately contacts with and is permanently secured, as by adhesive, to the rear face of the stencil-like sheet 1 and overlies the aperture 5 and preferably also the cut-out registration identifying insignia or the identifying means may be in the form of letters or designs of distinctive color impregnated through the sheet, or letters or designs embossed in relief or in intaglio in the sheet.

As illustrated herein the authenticating means comprises not only the embedded threads 6—A but also the word "LegaLicense" 7 impregnated or embossed in the portion of the sheet which is exposed through the aperture 5 so that alteration thereof is impossible.

The sheet thus constructed desirably is enclosed in a casing or sheath of synthetic plastic material which is rigid and practically infrangible. The casing or sheath comprises a front plate 8 of transparent material and a rear plate 9 of transparent or translucent material which desirably is of somewhat greater thickness and rigidity narrowly spaced from the front plate a sufficient distance to receive the license plate therebetween. The front and rear plates are marginally united in such spaced position throughout the greater part of their circumference leaving an opening along one edge through which the license plate may be introduced therebetween.

The front and rear plates 8 and 9 desirably may be made of suitable rigid thermoplastic material, such as cellulose acetate, Vinylite, or the like, and the marginal spacing may be provided by the insertion between the plates adjacent their edges of narrow strips 10 of like material which may be cohesively secured to said plates by a suitable solvent where the faces of the strips 10 abut the faces of the plates 8 and 9 as indicated at 18—A and 19—A in Fig. 2 or the casing or sheath may be integrally moulded or formed to provide an integral marginal union along the top and ends of the sheath which will reinforce and increase the rigidity of the sheath.

Where license plate units of the character described are constructed for attachment to vehicles they are provided with one or preferably a plurality of slots 11 and 12 through which suitable bolts or other attaching means may be inserted for transfixing the unit to a suitable support upon the vehicle. In the construction illustrated the slots 11 and 12 are located parallel to and a short distance from the open edge or mouth of the casing so that when the license plate is attached to the vehicle the fastening means which pass through the apertures 11 and 12 and preferably also through the number plate therebetween will permanently retain the same in assembled position.

A further feature of the invention comprises means for officially sealing the number plate in the casing against removal. In the construction illustrated suitable alined holes 13 and 14 are provided in the front and rear plates and also desirably in the number plate therebetween and sealing means inserted therethrough comprising deformable material adapted permanently to secure the parts together and to receive the impression of an agent authorized to apply the seal.

Any suitable form of seal may be employed, such for example as a rivet having a large head 15 and a shank 16 which passes through the alined holes 13 and 14 and is mushroomed to provide a head 17 engaging the face of the opposite sheet, a suitable impression being made by the tool applying the seal simultaneously with the mushrooming of the opposite end of the rivet.

Inasmuch as some vehicles have means for securing the license plate to the vehicle at its top instead of its bottom the upper edges of the sheets 8 and 9 and the spacing means 10 therebetween may be provided with extensions 18 and 19 having suitable horizontal slots 20 and 21 through which the bolts or other means for fastening the unit to the vehicle may be inserted.

Desirably the front sheet 8 is of clear transparent material. The rear sheet 9 may be of transparent material or of translucent material which will aid the observation of the authenticating means which is exposed through the aperture 5 in the license plate or the apertures or perforations of the registration number or insignia.

It will be understood that the particular embodiment of the invention which is shown and described herein is of an illustrative character and is not restrictive and that various modifications thereof may be made within the meaning and scope of the following claims.

Having thus described the invention, what is claimed as new and desired to be secured by Letters Patent is:

1. As an article of manufacture a vehicle-identifying unit, to be furnished by an official registrar to the registrant of a vehicle, comprising a license plate composed of a non-metallic license sheet of distinctive color having a plurality of apertures cut therethrough including the registration numbers or letters, the name or abbreviation of the State and the year of registration, and an authenticating translucent paper sheet permanently affixed to said license sheet, overlying said apertures and having undefaceable identifying insignia in the physical structure thereof overlying and visible through at least one of said apertures and a rigid substantially inflexible license plate enclosing sheath comprising two flat transparent plates of infrangible thermoplastic material marginally and continuously integrally united and reinforced by said thermoplastic material throughout the top and each end, the said plates being narrowly spaced and parallel within said margin to provide a chamber therebetween for the license plate, means crossing the space between the lower edge portions of said thermoplastic plates to retain the license plate in said chamber, and means by which said sheath may be secured to the vehicle.

2. A rigid substantially inflexible sheath for an authorized paper license plate comprising two flat transparent sheets of infrangible thermoplastic material marginally and continuously integrally united and reinforced by said thermoplastic material throughout the top and each end, the said plates being narrowly spaced and parallel within said margin to provide a chamber therebetween for the license plate, with the thicker integral marginal portions forming reinforcements increasing the rigidity of the sheath, alined apertures in the lower portions of said plates intermediate of the ends thereof to receive means crossing the space between the lower edge portions of said thermoplastic plates to retain the license plate in said chamber and to prevent unauthorized removal of the license plate, and means by which said sheath may be secured to the vehicle.

ROGER H. DUCEY.